No. 870,894. PATENTED NOV. 12, 1907.
H. O. MacDOUGALL.
TOASTER OR BROILER.
APPLICATION FILED FEB. 16, 1907.
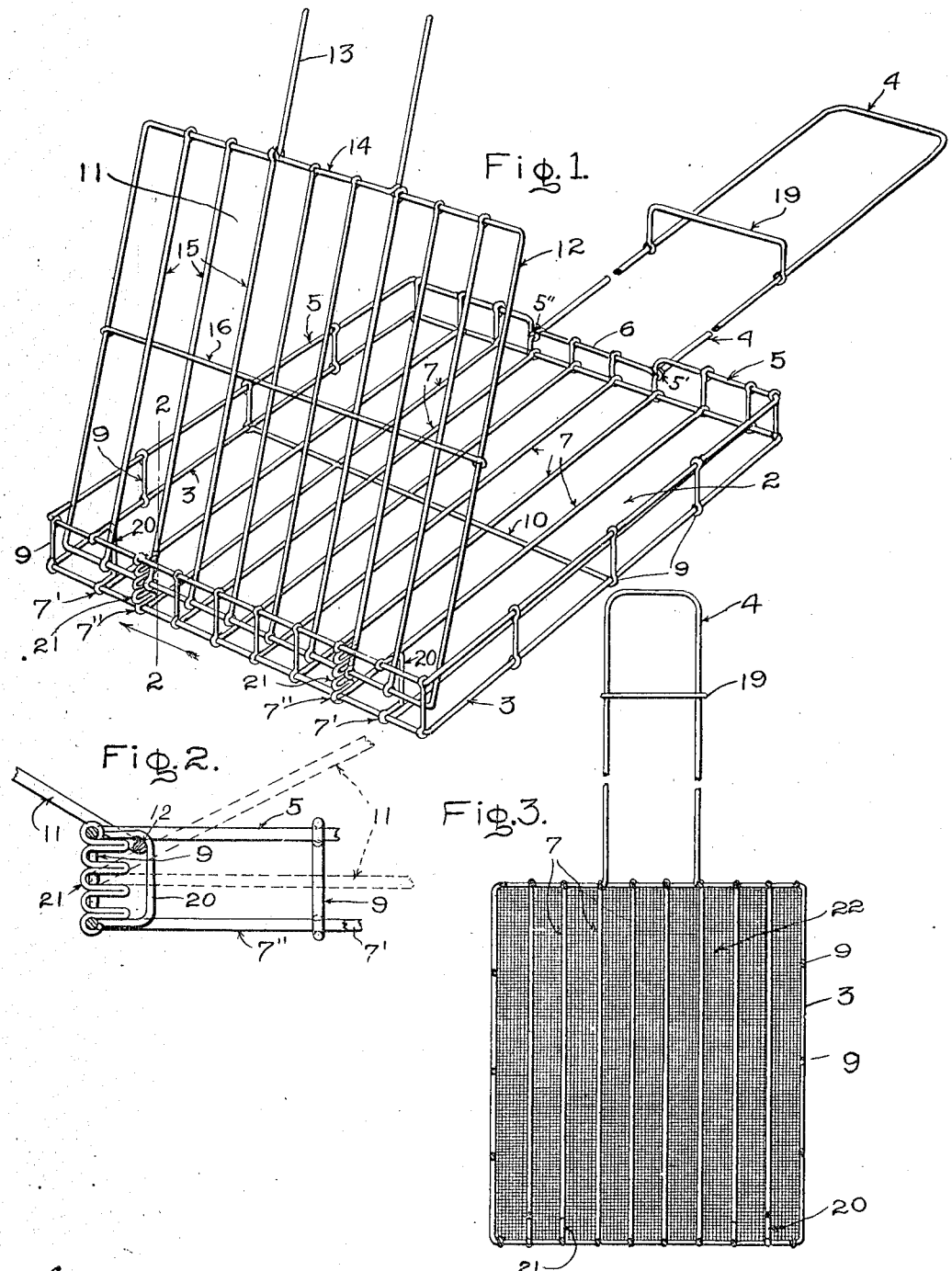
Witnesses:
M. G. Crozier
A. J. Foster
Inventor,
Harry O. MacDougall,
by Harry D. Wallace,
Att'y

UNITED STATES PATENT OFFICE.

HARRY O. MacDOUGALL, OF WATERTOWN, NEW YORK.

TOASTER OR BROILER.

No. 870,894.

Specification of Letters Patent.

Patented Nov. 12, 1907.

Application filed February 16, 1907. Serial No. 357,677.

*To all whom it may concern:*

Be it known that I, HARRY O. MACDOUGALL, a citizen of the United States, residing at Watertown, in the county of Jefferson and State of New York, have invented certain new and useful Improvements in Toasters or Broilers, of which the following is a specification.

This invention relates to improvements in toasters or broilers of that class in which the grid-iron is formed of two parts, comprising a basket and a hinged leaf or cover which fits inside the basket, and the invention relates particularly to a device of the class in which the cover is adjustable to different positions in and parallel to the bottom of the basket.

The object of the invention is to provide a toaster or broiler which is simple, light, durable and inexpensive, and wherein the construction and arrangement of the parts are such that objects of varying thickness, while being toasted or broiled, may be firmly held between the main parts of the grid-iron, and the device when filled may be held or carried in any position without danger of the bread, meat or other object becoming displaced, or escaping from between the two parts of the grid.

The invention consists principally in providing a basket and also a cover or lid therefor, preferably made of wire bent and woven in suitable form and capable of withstanding considerable wear, tear and abuse without getting out of order.

The invention further consists in providing simple but strong means for connecting or hinging the cover to the basket. And the invention further consists in providing novel means to coöperate with the hinges for adjusting the cover to different positions parallel to the bottom of the basket, for the purpose of holding objects of varying thickness.

Other features and objects of the invention will be fully understood from the detail description which follows, and by reference to the accompanying drawing which forms a part of this specification, and in which—

Figure 1 is a perspective view of the complete device, showing the same opened to receive or remove bread or meat; also showing the manner of constructing the cover and basket, and the means employed for hinging or connecting the cover to the basket. Fig. 2 is a sectional view, substantially on the line 2—2 of Fig. 1, showing in full lines, the cover in wide open position, supported by the hinge-loops; the dotted lines showing the cover in partially open and also in closed position, in engagement with the detented adjusting part. Fig. 3 is a plan view of the bottom of the basket, showing a modified form of toaster having a web of gauze or finely meshed wire in addition to the open strands of coarse wire shown in Fig. 1.

Similar numerals of reference are assigned to corresponding parts throughout the several views.

In the drawing, 2 represents a basket, which is preferably made of wire rectangular in form.

3 represents a wire, in one piece, which forms the outline of the bottom of the basket, and which is formed into a long narrow loop projecting from the center of one end of the basket to provide a handle 4. The upper rim of the basket is made of a single piece of wire 5, one end of which is attached to the handle 4 at the point numbered 5', and then extends around the basket and terminates at the opposite side of handle 4, where the other end is secured at 5".

6 represents a tie wire which extends across the inner open end of handle 4, the ends of which are connected to said handle, at or near the same points indicated for the wire 5. In forming handle 4 of the basket, wire 3 is bent upwards about one-half the depth of the basket, and then is bent outwardly to form the long loop 4. The tie wire 6 is disposed substantially on a level with the handle. The bottom of the basket comprises a series of longitudinal wires 7, which extend the full length of the basket, and at each end these wires are secured to the wire 3 by being coiled around it, and then they are bent upwardly and their ends are coiled around rim wire 5. By this means the basket is formed to a suitable and substantially uniform depth and will retain its shape. At the corners, and at short intervals along the sides of the basket, are disposed a series of vertical wires 9, which are secured to wires 3 and 5, for the purpose of preventing bread or meat from slipping out through the sides of the basket during the cooking. The wires 9, in connection with the wires 7, serve to hold the frame wires 3 and 5 in true parallel position. To make a light toaster and also to facilitate bending and weaving the metallic strands, the wires employed for the basket, except the upper and lower frame wires 3 and 5, are of comparatively small gage. The wires 7 being of small gage and of considerable length, require some bracing or tying to prevent them from becoming bent or distorted in the handling of the device, and for that purpose, I provide a cross-wire 10, which is interwoven with the wires 7, and the ends of said wire are secured to wires 3 and 5, in the same manner as described for the wires 7.

11 represents a substantially flat cover or leaf, comprising a continuous frame wire 12, which is formed or bent in the same manner as the wire 3, and also having a handle formed by projecting a loop 13 from the center of the inner end of said cover, the said handle being in the same plane as said frame wire 12. The frame 12 should be formed enough smaller than the rim 5 to allow the cover to drop into the basket.

14 represents a short wire forming a tie across the inner end of handle 13, corresponding to wire 6 of the basket.

15, 15 represent a series of wires disposed longitudinally across the cover 11, and these may be secured to frame 12 in any suitable manner. The wires 15, and also the wires 7, are preferably spaced about one-half an inch apart. A cross-wire 16 is applied to the central part of the cover, in the same manner and for the same purpose as wire 10 is secured to the bottom of the basket. The basket is preferably formed to a depth which will permit the toasting or broiling of bread or meat which may be cut in slices varying from a quarter of an inch to one inch or more in thickness. In order to hold the object to be cooked in the basket in a firm manner, it is essential that the cover be brought to bear tightly against the upper side of the same. The cover of my device is therefore made to a length and width which will allow it to drop into the basket, and in order to allow the cover to accommodate itself to the level indicated by the thickness of the bread or meat, the handle 13 should be made a little narrower at its inner end than the handle 4, so that it will sink into the depression formed by the wire 6, and the ends of wire 5.

19 represents a catch or clamp, preferably made of heavy wire or sheet metal, and arranged to slide on both of the arms of handle 4, for the purpose of catching and holding handle 13 of the cover in place, when the toaster is being used. The outer end of the cover is hinged to the outer end of the basket, by means of a pair of loops or parts 20, which are preferably formed integrally with the wires 7′. In forming the loops 20, the outer ends of wires 7′ are first coiled part way around the wire 3, and then bent inwardly and upwardly and outwardly and their ends coiled around wire 5. In assembling the cover and basket, the outer end of the cover 11, or rather the frame wire 12, is inserted in the loops 20 before the ends are secured to wire 5.

21 represents one or more detented adjusting parts, which are preferably formed integrally with the wires 7″, the said wires being folded back and forth to form a number of notches or finger-like parts, into, or between which wire 12 of the cover may be inserted and held, for the purpose of adjusting the outer end of the cover to different positions with reference to the bottom of the basket. I prefer to employ two of the corrugated parts 21, to coöperate with the depression 6 for adjusting the cover to several positions parallel to the bottom of the basket. Each of the parts 21 are formed exactly alike, and they are disposed in the basket in such manner that the detents of one will register with those of the other, and hence, when the cover is placed in corresponding notches in these parts, it will be held rigidly in a position parallel to the plane of the bottom of the basket. The detented parts 21 may be made of sheet metal, and employed with the same results as the wires. If a very thin slice of bread or meat is placed in the basket, the cover will be set in the lowermost notches of the parts 21, and when the cover is closed down upon the bread or meat, the inner end of handle 13 will drop into depression 6, and when clasp 19 is slipped over handle 13, the cover will be held firmly in place, and the bread or meat will also be held from any movement between the cover and bottom of the basket. If a thicker piece of bread is to be toasted in the device, the cover will be set in one of the uppermost notches 21, and when let down in the basket, handle 13 will accommodate itself to the new level, and the effect will be the same as just described. To remove an object after it has been cooked in my device, clamp 19 will be moved or slid outwardly on handle 4 till cover handle 13 is free. Then the cover may be lifted and swung upward and backward a suitable distance to allow the basket to be emptied. If it is attempted to open the cover any considerable distance while wire 12 is engaging the adjusting notches 21, the said wire will come in contact with rim wire 5 of the basket, and will be forced out of said notches, and then the cover may be swung backward to the position shown by the full lines in Fig. 2, where it will be held by the loops 20. When carrying my toaster about, the hinged end will naturally be held lower than the handles, and for that reason, the cover will gravitate into the notches 21, or if already in such position, it will remain there by its own weight, until it is shifted or moved forward in the basket. Under this construction and arrangement, the cover cannot easily be shifted or displaced from the adjusting notches while the device is being used.

Fig. 3 shows a modified form of my toaster, in which the bottom of the basket is covered with a web of fine wire netting or gauze 22, in addition to the bottom wires 7. Otherwise the construction of the device is the same as shown in Figs. 1 and 2. In this modified device, the bread or meat will rest upon the wires 7 and also upon the gauze or netting 22, and the cover, which may also be fitted with the same material, will be adjusted to bear down upon the opposite side of the object to be cooked, in the same manner as described above. The finely meshed wire is for use in connection with gas ranges &c., where the flame is close to the surface of the stove. But for toasting or broiling over the coals of an ordinary cook-stove or range, the coarse wire structure illustrated in Figs. 1 and 2 is preferred.

It is obvious that changes or modifications may be made in some of the parts without departing from the spirit of the invention, and I therefore do not restrict myself to the precise construction and arrangements of the same as herein shown and described.

Having thus described my invention, what I claim as new and desire to secure by Letters Patent, is—

1. A device of the class described, comprising a wire basket having a clear open top and an open wire bottom, a looped handle formed on the inner end of said basket, a flat wire cover adapted to fit into the open side of said basket, a series of loops formed integrally with certain of the bottom wires of said basket for use in hinging the outer end of said cover to the outer end of said basket, a series of detented or corrugated parts formed integrally with certain other bottom wires of said basket adapted to effect the adjustment of said cover to different positions in said basket, a handle formed on the inner end of said cover, and means for adjusting said cover handle to different positions, substantially as described.

2. A toaster, comprising a basket grid made of wire, a wire cover adapted to fit into said basket, a pair of hinge-loops formed integrally with two of the bottom wires of said basket adapted to connect said cover to said basket, a pair of detented or corrugated adjusting parts disposed between said hinge-loops and adapted to effect a hinged adjustment with the end of said cover for the several positions within and parallel to the bottom of said basket, and means for adjusting the free end of said cover, substantially as described.

3. A toaster or broiler, comprising a wire basket having a handle projecting from the inner end and having one open side, a wire cover to close the open side of said basket and having a handle on its inner end adapted to register substantially with the handle of said basket, and means for adjustably hinging said cover to the outer end of said basket, substantialy as described.

4. In a toaster or broiler, the combination with a wire basket and a wire cover or lid adapted to fit therein, of a pair of hinge-loops carried by said basket adapted to operatively connect or join said cover or lid to the outer end of said basket, and a pair of detented parts for adjusting the connected end of said cover or lid to different positions in and parallel to the top and bottom of said basket, substantially as described.

5. A toaster, comprising a basket, a cover hinged at its outer end to the outer end of said basket, and a pair of detented or corrugated parts formed with the outer end of said basket adapted to effect the adjustment of the hinged end of said cover to a number of different positions, substantially as described.

In testimony whereof I affix my signature in presence of two witnesses.

HARRY O. MacDOUGALL.

Witnesses:
EDGAR V. BLOODOUGH,
HARRY DE WALLACE.